United States Patent [19]
Lindemann

[11] 3,875,100
[45] Apr. 1, 1975

[54] THERMOSETTING VINYL OR VINYLIDENE HALIDE EMULSION COPOLYMERS

[75] Inventor: Martin K. Lindemann, Greenville, S.C.

[73] Assignee: Chas S. Tanner Co., Greenville, S.C.

[22] Filed: Jan. 16, 1974

[21] Appl. No.: 433,635

Related U.S. Application Data

[63] Continuation-in-part of Ser. No. 142,406, May 11, 1971, abandoned.

[52] U.S. Cl. .................. 260/29.6 TA, 260/80.73
[51] Int. Cl. ............................................. C08f 45/24
[58] Field of Search...260/29.4 UA, 29.6 T, 29.6 TA, 260/80.73

[56] References Cited
UNITED STATES PATENTS
3,391,181  7/1968  Scheuerl ............................ 260/482
3,647,615  3/1972  Fallwell ............................ 260/80.73
3,775,512  11/1973  Lanthier ....................... 260/29.4 UA FOREIGN PATENTS OR APPLICATIONS
610,432  12/1960  Canada ....................... 260/29.4 UA

*Primary Examiner*—Lorenzo B. Hayes
*Attorney, Agent, or Firm*—Dressler, Goldsmith, Clement & Gordon, Ltd.

[57] ABSTRACT

Vinyl or vinylidene halide emulsion copolymers are modified to introduce improved thermosetting cure capacity by including in the copolymer a proportion of a formaldehyde addition product with an allyl carbamate.

8 Claims, No Drawings

THERMOSETTING VINYL OR VINYLIDENE HALIDE EMULSION COPOLYMERS

The present application is a continuation-in-part of my prior application Ser. No. 142,406, filed May 11, 1971, now abandoned.

The present invention relates to emulsion copolymers of vinyl and vinylidene halides, such as vinyl chloride, with ethylene or monoethylenic ester which has been modified to introduce improved thermosetting cure capacity. The vinyl halides are particularly preferred and these will be emphasized in this application. These emulsion copolymers are known to be useful as binders for nonwoven fabrics, as impregnants for woven fabrics, as a binder in printing pastes, as laminating adhesives, as paints, and for other similar purposes. These emulsion polymers are illustrated, for example, by U.S. Pat. No. 3,647,615, where N-methylol acrylamide is used to modify vinyl chloride copolymers in order to provide the desired curing characteristics. This invention has, as its main objective, the achievement of improved cure characteristics, which can be demonstrated by the achievement of increased insolubilization after cure.

In connection with the thermosetting characteristics which it is desired to achieve in accordance with the invention, the increased insolubilization which is achieved leads to many important benefits. With particular reference to fabrics which have been treated with the emulsions of the invention and then baked in order to cure the deposited copolymer, wash resistance and crocking are improved when the emulsion is used as a binder in a printing paste, nonwoven web integrity is improved when the emulsion is used as a binder for a nonwoven web, durability to washing is improved when the emulsion is used to modify the hand of a woven fabric, wash and solvent resistance are improved when the emulsion is used in a foam applied to a fabric to serve as a drapery backing, and peel strength is improved when the emulsion is used for laminating purpose. It is stressed that vinyl halides, such as vinyl chloride and ethylene, polymerize poorly from the standpoint of achieving desired high molecular weight, making the improved distribution of cross-linking obtained herein of especial significance.

As will be appreciated, the invention, like the prior art, is concerned with aqueous emulsions in which the aqueous medium has colloidally suspended therein an emulsion copolymer of vinyl or vinylidene halide, which has been modified to provide the properties noted above. Copolymers with ethylene are particularly contemplated.

In accordance with the invention, the vinyl or vinylidene halide emulsion copolymer is modified by the copolymerization therein of a formaldehyde adduct with an allyl carbamate. These allyl carbamates have the formula:

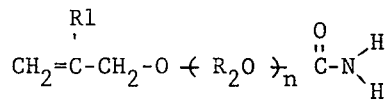

in which $R_1$ is hydrogen or methyl, $R_2$ is an alkylidene group containing from 2-4 carbon atoms, and $n$ is an integer from 0–10, preferably from 0–2, and most preferably 0.

Various allyl carbamates are useful herein, especially allyl carbamate. Allyl carbamate has the formula:

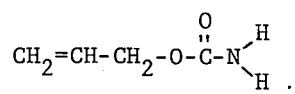

This monoethylenic monomer is not an amide and it will react with formaldehyde in an addition reaction with the two amino hydrogen atoms to generate the N-methylol group. When one molar proportion of formaldehyde is taken up, the derivative can be described by the formula:

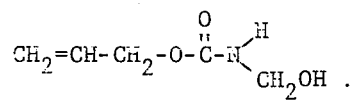

The same reaction can proceed to take up more formaldehyde to increase the N-methylol functionality which is generated.

Regardless of whether one or two moles of formaldehyde are reacted into the molecule, the monomer is an allyl ester and this is most important in the copolymerization with vinyl or vinylidene halide, since the monomer reactivity ratio of the allylic unsaturation of the allyl ester with vinyl or vinylidene halide is close to 1:1. In contrast, methylol acrylamide enters the vinyl or vinylidene halide copolymer much too rapidly, forcing a considerable portion of the polymer to lack the reactive group which is the basic for subsequent insolubilization.

The emulsion copolymerization is also improved herein by the increased hydrophobicity conferred by the allyl group creating a synergistic improvement in the capacity of the copolymer to become insolubilized on curing. Such hydrophobicity can also be enhanced by employing an ether group, as will be explained.

As previously indicated, the allyl carbamate may include either groups between the allyl group and the carbamate group. These ethers can be provided by reacting the allyl alcohol with an alkylene oxide, such as ethylene oxide, before converting the resulting alcohol to the carbamate as will be illustrated hereinafter.

The adduction of the carbamate with formaldehyde is well known and conventional and yields N-methylol derivatives. These are a mixture of the mono-N-methylol adduct, the di-N-methylol adduct and unreacted carbamate which, if present, is not harmful.

The N-methylol groups in this invention may be etherified with a $C_1$–$C_8$ alcohol, preferably a $C_1$–$C_4$ alcohol, though this is not essential. The alcohol is released on baking to regenerate the N-methylol group for cure, as is well known. Appropriate alcohols for etherification are methyl alcohol and ethyl alcohol. Isopropyl alcohol, isobutyl alcohol, 2-ethoxy ethanol and 2-butoxy ethanol will further illustrate useful alcohols.

While the invention is primarily applicable to vinyl halides, the vinylidene halides exhibit the same problem and respond in the same way to this invention. Among the halides, the chlorides are most commonly available, and are most economical so that this invention is primarily addressed to the use of vinyl chloride and vinylidene chloride. On the other hand, the corresponding bromides introduce superior fire resistance and, when this characteristic is important, the bromides may be used. Similarly, the corresponding fluorides provide polymers which are very inert and, when it is desired to obtain maximum corrosion resistance and durability, the corresponding fluorides may be used. The iodides are also subject to use in this invention, but these would only be used to provide special properties. Of course, mixtures of vinyl and vinylidene halides can be used, and the different halides are also useful in admixture.

Also, and while copolymers with ethylene are especially important, the invention includes copolymers in which the ethylene is wholly or partially replaced with a monoethylenic carboxylic acid ester which provides the desired internal plasticization. The ester group will contain a terminal saturated hydrocarbon group having at least 2 carbon atoms, preferably at least 4 carbon atoms, and is usually an alkyl ester of an alpha, beta-ethylenically unsaturated acid such as maleic acid, fumaric acid, acrylic acid, crotonic acid, itaconic acid, and the like. These are illustrated by butyl acrylate, diethyl maleate, and isooctyl crotonate. Other esters such as vinyl hexoate are also useful, though less preferred. The ester group may contain up to about 18 carbon atoms.

From the standpoint of proportions, the vinyl or vinylidene halide will constitute from 35–96.5% of the copolymer, preferably 45–75%. The ethylene component will constitute from 3–60%, preferably from 10–45%, and most preferably from 20–40%. When an ester component is used, the ester content of the copolymer will be the same as the ethylene content. Of course, mixtures of ethylene and ester in the same total amount can be used.

The monomers providing thermosetting or cure capacity may be used in an amount of from 0.5–15%, preferably 2–10%, based on the weight of the copolymer. At least 0.5%, preferably at least 1%, based on the weight of the copolymer, will be constituted by the formaldehyde addition product with the allyl carbamate compound, preferably from 1% to 8%. However, other monomers which can coreact with the N-methylol group may also be present to assist in the cure, such as monoethylenic amides or alcohols, either alone or together with one another or with a monoethylenic carboxylic acid.

The coreactive monomers are illustrated by acrylamide, methacrylamide, or other monoethylenic amide, or by allyl alcohol, 2-hydroxy ethyl acrylate or methacrylate, or the like. Monoethylenic carboxylic acids are illustrated by acrylic acid, methacrylic acid, and crotonic acid. These acids are used in an amount of from 0.5–3%.

Other monomers which may be present in an amount up to about 20% of the copolymer are illustrated by acrylonitrile, methyl methacrylate, styrene, or vinyl acetate.

Since the aqueous emulsion polymerization of vinyl chloride or vinylidene chloride either alone or with ethylene or esters such as butyl acrylate is well known per se, it will not be described at length. However, it is stressed that the N-methylol allyl carbamate is easier to use since it will enter the copolymer at about the same rate as the vinyl or vinylidene halide so that the distribution of the N-methylol group in the final copolymer is considerably improved. Auxiliary agents may also be present, as is known, such as protective colloids illustrated by polyvinyl alcohol and hydroxy ethyl cellulose.

From the standpoint of cure, baking is normally carried out at temperatures of from 250°–500°F. for periods of from 30 seconds to 1 hour, but more usually at 275°–350°F. for from 2–20 minutes.

The proportions referred to herein and throughout this specification are by weight unless otherwise specified.

Example 1

| Monomer Emulsion (100% Charged) | Parts |
|---|---|
| Vinyl Chloride (Distilled) | 12000 grams |
| Sodium Lauryl Sulfate (30% Water Solution) | 1695 grams |
| Dioctyl Ester of Sodium Sulfo Succinic Acid in a 60% Water Solution | 847 grams |
| Acrylamide (16.9% in Water) | 2600 grams |
| N-Methylol Allyl Carbamate (16.9% in Water) | 2600 grams |

A stainless steel pressure reactor equipped with temperature controls and an agitator was charged with:

| Charge | Parts |
|---|---|
| Water | 10400 grams |
| Sodium Lauryl Sulfate (30% Water Solution) | 565 grams |
| Dioctyl Ester of Sodium Sulfo-succinic Acid in a 60% Water Solution | 282 grams |
| Previously Prepared Seed Polymer Emulsion at 45% Total Solids (Use previous batch of this Example or commercial polyvinyl chloride of particle size .15 micron) | 760 grams |
| Ferrous Sulfate | 0.15 gram |
| Maleic Anhydride | 75 grams |
| Monomer Emulsion of this Example | 1850 grams |
| Sodium Persulfate | 55 grams |

The reactor was purged with nitrogen, then with ethylene, after which the reactor was pressurized to 60 atmospheres with ethylene. After heating the reactor mixture to 50°C., 5 cc of a 6% water solution of sodium formaldehyde sulfoxylate were added, after which the reactor temperature rose to 53°C. The remaining monomer emulsion (to 100% of the total amount prepared) was added continuously over a five hour period. The reaction temperature was maintained exothermic by incremental additions of a total amount of 195 cc of a 6% sodium formaldehyde sulfoxylate solution, and 750 cc of a 10% sodium persulfate solution. The ethylene pressure was maintained at 60 atmospheres during most of the run, and then the ethylene pressure was slowly reduced to atmospheric pressure, and the pH was adjusted to 5.3 with ammonia. The product had the following properties:

| Viscosity (No. 3 spindle, 30 rpm Brookfied) | 1000 |
|---|---|
| Solids | 37.5% |
| Intrinsic Viscosity (measured in 1% dimethyl formamide at 30°C. and extrapolated to 0%). | 1.24 |
| Insolubles | |
| at pH 2.7 | 55.1% |
| at pH 8.0 | 52.8% |
| pH | 5.2 |
| Average Particle Size | 0.225 micron |
| Ethylene in Copolymer | 45% |

EXAMPLE 2

Example 1 was repeated, replacing the N-methylol ally carbamate with a corresponding weight of N-ethoxy methyl allyl carbamate. The final product cured to provide even better insolubility.

The invention is defined in the claims which follow.
I claim:

1. An aqueous emulsion comprising an aqueous medium having colloidally suspended therein an emulsion copolymer of from 35% to 96.5% of vinyl chloride, from 3% to 60% of ethylene, and from 5% to 15% of monomers providing thermosetting characteristics and comprising at least 0.5% of the N-methylol functional addition product of formaldehyde with an allyl carbamate having the formula:

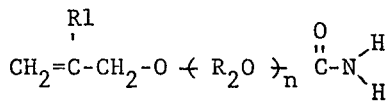

in which $R_1$ is hydrogen or methyl, $R_2$ is an alkylidene group containing from 2-4 carbon atoms, and $n$ is an integer from 0-10.

2. An aqueous emulsion as recited in claim 1 in which said addition product contains from 1-2 moles of formaldehyde per mole of said carbamate.

3. An aqueous emulsion as recited in claim 1 in which said allyl carbamate addition product is mono-N-methylol allyl carbamate.

4. An emulsion as recited in claim 1 in which said copolymer further includes from 0.5% to 3% of a monoethylenic carboxylic acid.

5. An emulsion as recited in claim 1 in which $n$ is 0.

6. An emulsion as recited in claim 1 in which said N-methylol functional addition product is etherified with a $C_1 - C_8$ alcohol.

7. An aqueous emulsion as recited in claim 1 in which said monomers providing thermosetting characteristics includes an acrylamide.

8. An aqueous emulsion as recited in claim 1 in which said copolymer consists of from 45% to 75% of vinyl chloride, from 10% to 45% of ethylene, and from 2% to 10% of monomers providing thermosetting characteristics and comprising at least 1% of N-methylol allyl carbamate.

* * * * *